United States Patent [19]

Smart

[11] Patent Number: 5,650,682

[45] Date of Patent: Jul. 22, 1997

[54] SINGLE-PHASE VARIABLE RELUCTANCE MOTOR HAVING PERMANENT MAGNETS EMBEDDED WITHIN A PHASE WINDING

[75] Inventor: James Christopher Rudd Smart, Horsforth, United Kingdom

[73] Assignee: Switched Reluctance Drives, Ltd., Harrogate, United Kingdom

[21] Appl. No.: 472,508

[22] Filed: Jun. 7, 1995

[30] Foreign Application Priority Data

Mar. 29, 1995 [GB] United Kingdom ............... 9506461

[51] Int. Cl.$^6$ ................................................. H02K 21/38
[52] U.S. Cl. ......................... 310/181; 310/154; 310/168
[58] Field of Search ................................ 310/181, 154, 310/254, 168, 179, 67 R, 186

[56] References Cited

U.S. PATENT DOCUMENTS

| | | | |
|---|---|---|---|
| 1,311,542 | 7/1919 | Turbayne | 310/181 |
| 3,932,069 | 1/1976 | Giardini et al. | 417/420 |
| 4,048,531 | 9/1977 | Buess et al. | 310/49 R |
| 4,181,875 | 1/1980 | Kozhai et al. | 318/252 |
| 4,217,513 | 8/1980 | Kohzai et al. | 310/186 |
| 4,712,028 | 12/1987 | Horber | 310/49 R |
| 4,713,594 | 12/1987 | Bose | 318/685 |
| 4,728,833 | 3/1988 | Shiraki et al. | 310/68 R |
| 4,737,674 | 4/1988 | Miyao | 310/268 |
| 4,748,387 | 5/1988 | Tanuma et al. | 318/254 |
| 4,795,953 | 1/1989 | Compter et al. | 318/696 |
| 4,972,112 | 11/1990 | Kim | 310/181 |
| 4,995,159 | 2/1991 | Hancock et al. | 29/596 |
| 5,117,144 | 5/1992 | Torok | 310/269 |
| 5,122,697 | 6/1992 | Horst | 310/181 |
| 5,233,254 | 8/1993 | Fisher et al. | 310/261 |
| 5,239,217 | 8/1993 | Horst | 310/51 |
| 5,327,069 | 7/1994 | Radun et al. | 322/10 |
| 5,345,131 | 9/1994 | Torok | 310/181 |
| 5,386,162 | 1/1995 | Horst | 310/51 |
| 5,455,474 | 10/1995 | Flynn | 310/181 |

FOREIGN PATENT DOCUMENTS

| | | | |
|---|---|---|---|
| 0163328B1 | 4/1985 | European Pat. Off. | H02P 7/00 |
| 0528750A2 | 7/1992 | European Pat. Off. | H02K 19/06 |
| 54-153320 | 11/1979 | Japan | H02K 29/00 |
| WO86/06891 | 5/1986 | WIPO | H02K 19/06 |
| WO92/12567 | 12/1991 | WIPO | H02K 19/06 |

OTHER PUBLICATIONS

Chan & Bolton, *Development of sub–KW Single–phase Switched Reluctance Motor Drives*, pp. 527–531, School of Electrical, Electronics and Systems Engineering, University of Wales College of Cardiff.

Stephenson and Blake, *The Characteristics, Design and Applications of Switched Reluctance Motors and Drives*, (Jun. 1993, Nuremberg, Germany).

*Primary Examiner*—Thomas M. Dougherty
*Assistant Examiner*—Michael Wallace, Jr.
*Attorney, Agent, or Firm*—Arnold, White & Durkee

[57] ABSTRACT

A single-phase variable reluctance motor is disclosed. The motor includes a stator having a pair of projecting poles defining a principal axis and a rotor mounted on a rotatable shaft co-axial with the principal axis of the stator. The stator may have inwardly extending poles that terminate in a central bore and the rotor may be rotatably disposed in the central bore. In such an embodiment, the stator poles are arranged generally diametrically opposed to one another. The rotor is mounted on a shaft and has a pair of poles generally diametrically opposed from each other. The stator and rotor may be formed from laminations of a ferromagnetic material. Energizing coils are wound around one or more of the stator poles. When energized, the energizing coil(s) impart a torque on the rotor causing it to rotate. One or more permanent magnets are inserted into the winding(s) forming the energizing coil(s) to park the rotor in a preferred starting position when the motor is turned off. A pair of slot wedges is also provided to separate the energizing coils from the central bore. The slot wedges are inserted into notches formed in the stator poles to retain the slot wedges in the central bore. The slot wedges have cut-out portions which are aligned with the permanent magnets to expose them to the central bore.

18 Claims, 6 Drawing Sheets

SINGLE-PHASE VARIABLE RELUCTANCE MOTOR HAVING PERMANENT MAGNETS EMBEDDED WITHIN A PHASE WINDING

FIELD OF THE INVENTION

The present invention relates generally to variable reluctance motors, and more particularly, is directed to a single-phase variable reluctance motor that employs permanent magnets to ensure that the rotor always comes to rest in a preferred starting position, thereby enabling reliable restart of the motor.

BACKGROUND OF THE INVENTION

Single-phase variable reluctance motors are well known in the art. They are particularly simple to construct and they can operate with a low-cost electronic controller. The single-phase variable reluctance drive is therefore an attractive choice for use in certain cost-sensitive applications such as fans and pumps.

These brushless motors employ one or more exciting windings and a magnetic circuit to produce mechanical torque which is substantially proportional to the square of the winding ampere-turns and to the angular rate of change of the magnetic circuit inductance, which is a function of the displacement of the rotor in the motor. Typically, these motors employ a stator containing one or more windings and a rotor mounted coaxially relative to the stator, typically within the stator on bearings. Displacement of the rotor relative to the stator produces a variation of the reluctance of the magnetic circuit.

The torque produced by a variable reluctance motor is proportional to the product of the square of the winding ampere-turns and the angular rate of change of inductance as a function of rotor displacement. Accordingly, motor torque that is positive with respect to some arbitrary reference can only be developed when winding ampere-turns are sustained during an interval in which the inductance increases with rotor displacement. Conversely, negative motor torque is developed when winding ampere-turns are sustained during an interval in which the inductance decreases with rotor displacement. In order to secure continuous rotation of the variable reluctance motor, it is necessary to apply ampere-turns to the motor winding during intervals of increasing inductance and to decrease or eliminate such ampere-turns during intervals of decreasing inductance.

From the foregoing, it is apparent that the winding(s) of the variable reluctance motor must be excited from a time varying source. Furthermore, the time variations of the source must be synchronized with the mechanical rotation of the rotor so that winding current is supplied to the motor during intervals in which the inductance increases with displacement and so that such current is decreased or, preferably, eliminated during the intervals in which the inductance is decreasing with rotor displacement. When a time-invariant source of electrical energy, such as a direct current source, is used, a controller is required to produce synchronized pulsations of voltage or current. The instants at which pulses are applied to and removed from the winding (s) are determined by a rotor position transducer (RPT) which sends data describing the rotor position to the controller.

The single-phase variable reluctance motor, although simple to construct, has several drawbacks.

FIG. 1 shows a typical plot of starting torque against angular rotor displacement for a known single-phase variable reluctance motor. It will be seen that the machine only develops torque in, for example, the positive direction between point 2 and point 4. To rotate in the positive direction, it would preferably only have current supplied to its exciting coil(s) when the rotor position is between points 2 and 4 and it preferably would not have current supplied when the rotor position is between points 5 and 6. In the regions between points 1 and 2 and points 4 and 5, current flowing will produce virtually no torque. It is therefore clear that the average torque in the desired direction over a complete cycle is much less than the peak torque $T_{max}$.

As FIG. 1 indicates, the average starting torque of single-phase variable reluctance motors is low. This is generally not a problem for low-torque applications such as fans, but is a problem for high-torque applications such as conveyors on assembly lines. A more significant drawback with single-phase variable reluctance motors that is clear from FIG. 1 is that the rotor may assume a position at rest at which little or no torque is developed in the desired direction and hence from which it is impossible to start the motor in the desired direction. This corresponds to any position in the regions defined by points 1–2 and points 4–6.

A solution to this problem has been to use small permanent magnets to "park" the rotor in a position at which it can generate adequate starting torque, in the desired direction e.g. point 3 in FIG. 1. Such a solution has been described, e.g. in European Patents Nos. 163328 and 601818. These patents disclose the use of one or more small permanent magnets suitably affixed within the stator structure at an appropriate angle for "parking" the rotor in a position where sufficient torque is developed to restart the motor in the desired direction. As described above, there is a critical region in which the rotor must not stop if the motor is to start again. The magnet torque from the magnetic field of the magnet in this critical region must be sufficient to overcome the friction due to the bearings or the rotor will stop in the critical area. The motor will not start if this should occur. The parking magnets ensure that the rotor does not stop in this critical region.

One disadvantage with parking magnets as used in the known systems is that the parking magnets take up physical space and require additional manufacturing steps to properly position the parking magnets. Moreover, the use of parking magnets has been heretofore difficult with variable reluctance machines having two stator poles and two rotor poles. In most known variable reluctance systems employing parking magnets, both the rotor and the stator have four poles. In such 4/4 motors, a convenient position can normally be found for the parking magnets so that the position at which the rotor is brought to rest is one from which the motor will develop good starting torque when the motor is energized. In motors having two stator poles and two rotor poles (2/2 motors) it is difficult to identify a location where the magnets can be affixed and still park the rotor in a preferred position. Known techniques generally have not allowed for the convenient use of parking magnets in 2/2 motors. This is disadvantageous in that a 2/2 pole combination is often favored for high speed operation.

The present invention is directed to overcoming these and other disadvantages of the prior art.

SUMMARY OF THE INVENTION

The present invention is directed to a single-phase variable reluctance motor including a stator having a pair of projecting poles defining a principal axis and a rotor mounted on a rotatable shaft co-axial with the principal axis of the stator. In one embodiment the stator poles are inwardly projecting and terminate at a central bore. In that embodiment, the rotor is rotatably disposed within the central bore. The stator poles are arranged generally diametrically opposed to one another. The rotor is mounted to a shaft and has a pair of poles generally diametrically opposed from each other. The stator and rotor are typically formed from laminations of a ferromagnetic material. Energizing coils are wound around one or both of the stator poles. When energized, the energizing coils set up magnetic flux in the magnetic circuit of the machine. This flux imparts a torque on the rotor causing it to rotate. One or a pair of permanent magnets are inserted into the winding(s) forming the energizing coil(s) to park the rotor in a preferred starting position when the motor is turned off. If a pair of magnets is used, the magnets are disposed diametrically opposed from one another.

In one embodiment of the present invention, a pair of slot wedges are provided to separate the energizing coils from the central bore. The slot wedges are inserted into notches formed in the stator poles that retain the slot wedges in the correct position around the central bore. The slot wedges have cut-out portions into which the permanent magnets are inserted. The wedges hold the magnets in the correct position with respect to the central bore and thereby enable them to impart a stronger magnetic force on the rotor poles by decreasing the separation between the parking magnets and the rotor poles. When the motor is turned off, the only force acting on the rotor poles is the magnetic force imparted by the permanent magnets. This force aligns the rotor in a preselected position at which the motor will develop adequate starting torque when it is re-energized.

BRIEF DESCRIPTION OF THE DRAWINGS

The foregoing and other features of the present invention will be best appreciated with reference to the detailed description of the invention, which follows, when read in conjunction with the accompanying drawings, wherein.

DETAILED DESCRIPTION OF THE INVENTION

Figure 1:
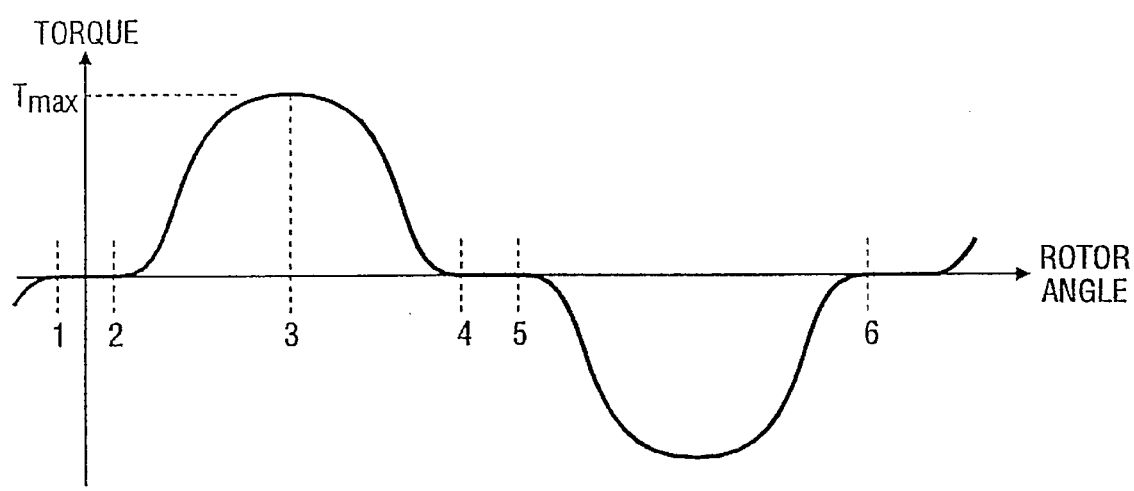
FIG. 1 shows an exemplary plot of starting torque against angular displacement of the rotor for a single-phase reluctance motor.
Figure 2:
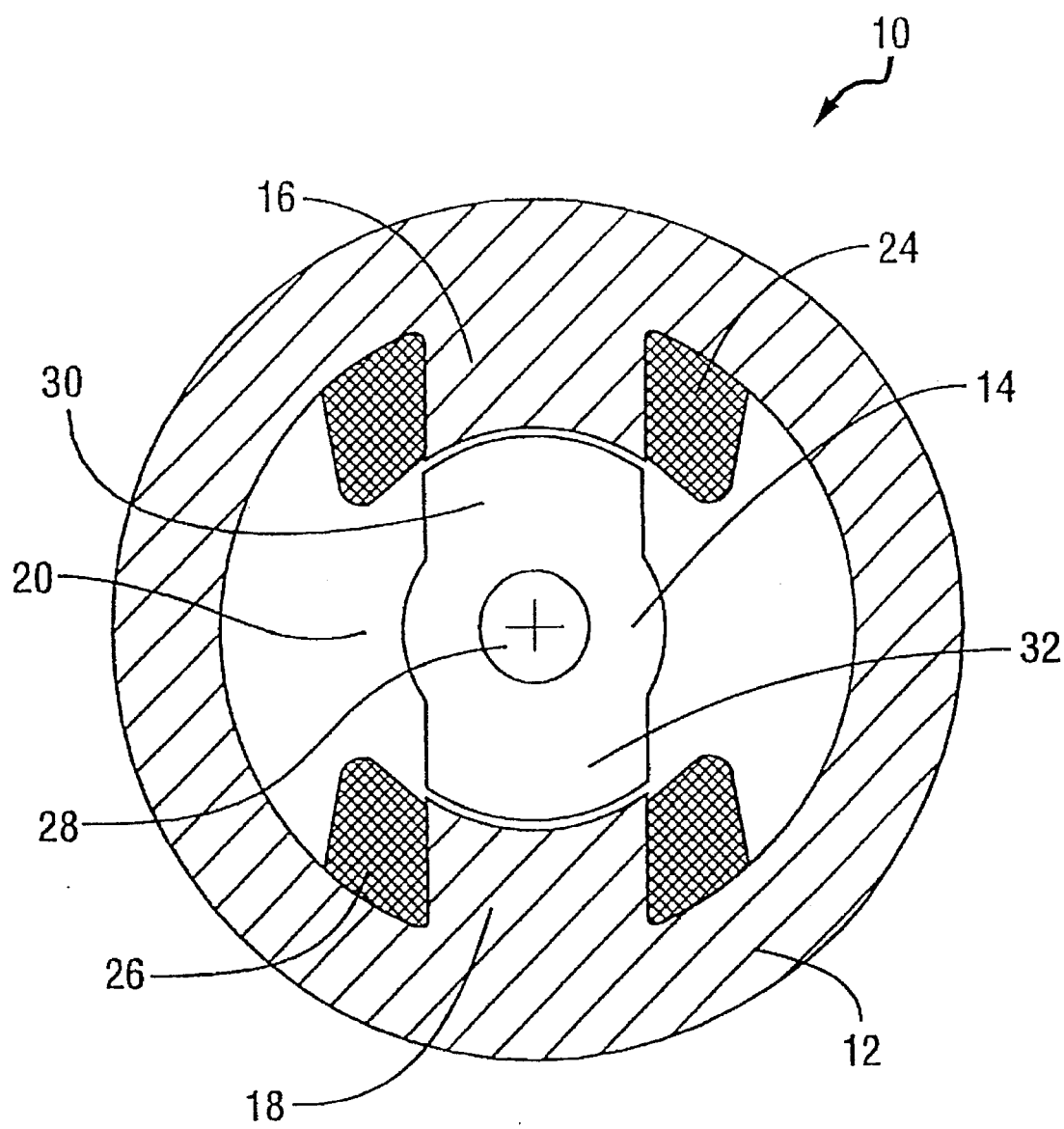
FIG. 2 is a diagram of a prior art single-phase variable reluctance motor.

Turning now to the drawings and referring initially to FIG. 2, a prior art single-phase variable reluctance motor is shown generally by reference numeral 10. For the sake of illustration, the simplest form of motor having two stator poles and two rotor poles (i.e. a 2/2 motor) is shown. Those skilled in the art will recognize that 4/4, 6/6 and other combinations are possible and that the present invention applies also to such motors. Moreover, the present invention is applicable to inverted motors where the stator has radially outwardly projecting poles and is positioned within the bore of an outer rotating rotor.

The motor 10 comprises a stator 12 and a rotor 14. The stator 12 has a pair of projecting poles 16 and 18 that define a principal stator axis extending outward from FIG. 2. In FIG. 2, the poles are inwardly extending and terminate at a central bore. The poles 16 and 18 are disposed 180 degrees with respect to each other. The stator 12 and the rotor 14 are formed from laminations of a ferromagnetic material. Energizing coils 24 and 26 are wound around the poles 16 and 18, respectively. In one embodiment, the energizing coils 24 and 26 are wound 220 turns around each pole 16 and 18, although a different number of turns may be used. The energizing coils 24 and 26, when energized, cause a temporary magnetization of the stator poles 16 and 18.

The rotor 14 has a plurality of projecting poles 30 and 32. The rotor 14 is mounted to a rotatable shaft 28 co-axial with the principal axis of the stator. In FIG. 2, the rotor poles are outwardly extending and the rotor is rotatably disposed in the central bore.

When the energizing coils 24 and 26 are energized, typically by applying voltage to them from a power source (not shown), the poles 16 and 18 become "magnetized" and thus form electro-magnetic poles. These magnetic poles attract the poles 30 and 32 on the rotor 14 thereby imparting a torque on the rotor.

Figure 3A:
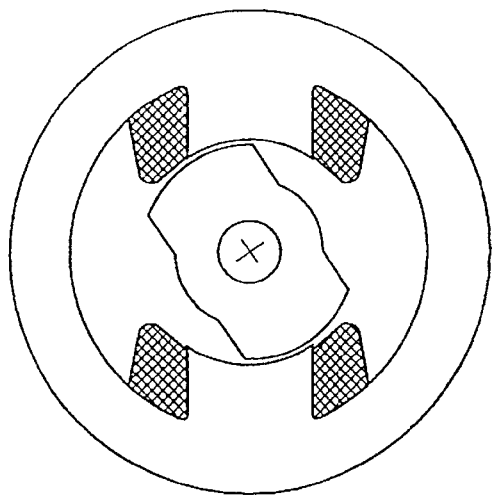
FIGS. 3A–D are diagrams of the motor shown in FIG. 2 illustrating various positions of the rotor relative to the stator poles.

Assuming a clockwise rotation, when the rotor 14 is in position A (shown in FIG. 3A), the stator poles 16 and 18 are energized and a substantial torque is imparted on the rotor 14. The stator poles 16 and 18 remain energized until the rotor 14 passes through the fully aligned position, shown in FIG. 3B. In the fully aligned position the torque imparted on the rotor 14 is zero. During operation, at or around the instant that the rotor 14 passes through this position, the stator poles 16 and 18 are de-energized thus causing the rotor 14 to freely rotate. If the stator poles 16 and 18 were not de-energized at or near this point, a negative torque would be applied to the rotor 14 thus attempting to reverse its direction of rotation. As explained above, if the rotor 14 comes to rest in the fully aligned position when the motor 10 is turned "off", it cannot be restarted by the electromagnetic force generated by the "energized" stator poles 16 and 18 alone. It remains stuck in this position.

In position C (shown in FIG. 3C), the stator poles 16 and 18 remain deenergized thereby allowing the rotor 14 to freely rotate. The rotor 14 freely rotates in the clockwise direction until it reaches position D (shown in FIG. 3D), known as the minimum inductance position. The torque imparted on the rotor 14 in this position is zero. At or around the instant that the rotor 14 passes through position D, the stator poles 16 and 18 are once again energized thereby imparting a torque to the rotor which increases to a high value once the rotor 14 again reaches position A. The rotor 14 rotates through 180 degrees as it rotates from position A, through positions B, C, and D and back to position A, as shown in FIGS. 3A–D.

Figure 3B:
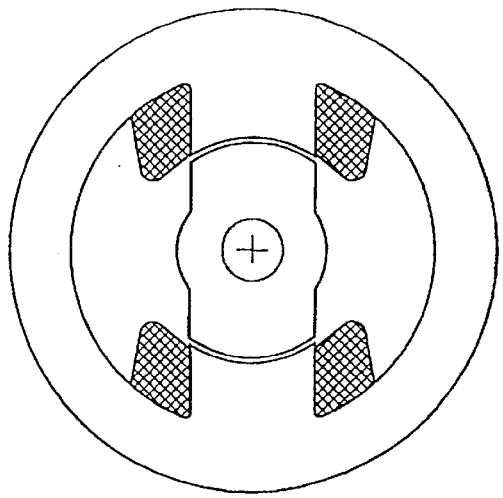
Figure 3C:
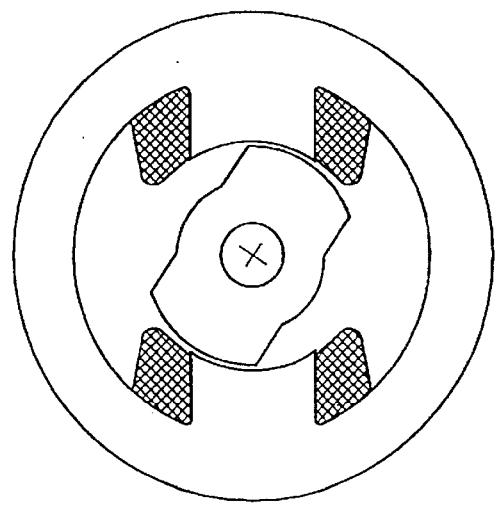
Figure 3D:
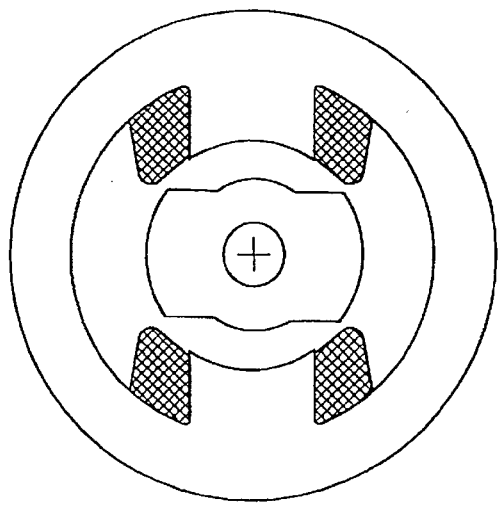

The object of this invention is to overcome the problem in the prior art devices of being unable to restart the motor 10 when the rotor 14 stops in a position at which it cannot develop adequate starting torque in the desired direction. Two such positions are generally illustrated in FIGS. 3B and 3D. The present invention solves this problem by providing one or a pair of permanent magnets which are disposed within the energizing coil(s) 24 and 26, respectively. This configuration insures that the rotor 14 assumes a position at rest from which a reliable restart of the motor 10 can be ensured.

Figure 4:
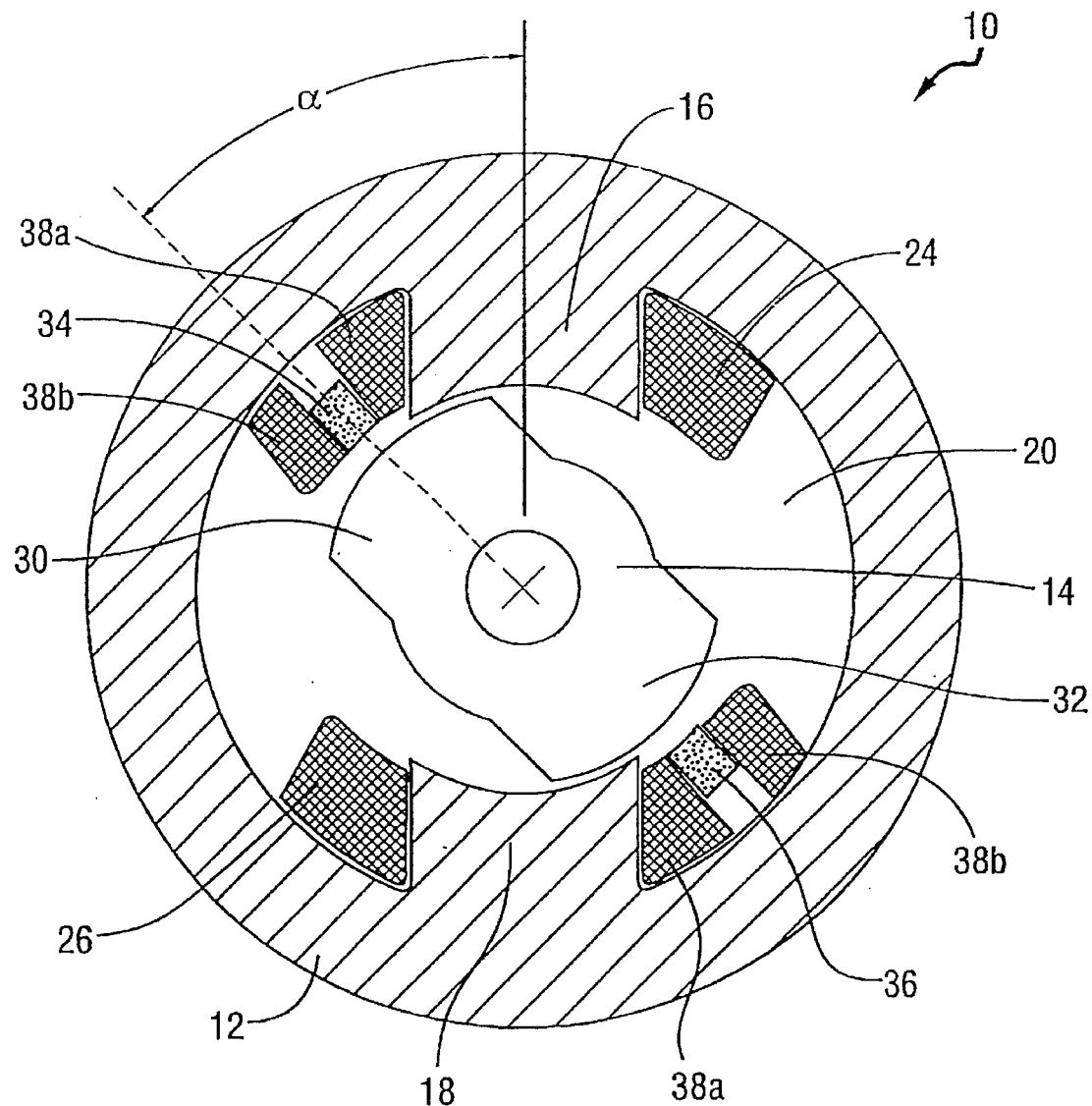
FIG. 4 is a diagram of one embodiment of a single-phase variable reluctance motor according to the present invention.

Referring now to FIG. 4, one embodiment of the present invention is shown. In this embodiment, a pair of permanent magnets 34 and 36 are inserted into the energizing coils 24 and 26, respectively. The magnets 34 and 36 are disposed about the poles 16 and 18, respectively, so that each magnet is generally disposed 180 degrees with respect to the other. This configuration causes the rotor 12 to "park" at or near an angle α from the completely aligned position when the motor 10 is turned off. As illustrated, the ends of the magnets that project into central bore 20 may be manufactured, machined or finished to have a radius of curvature corresponding to that of the rotor poles.

When the motor 10 is turned on and the stator poles 16 and 18 are energized, the rotor poles 30 and 32 are attracted toward the stator poles 16 and 18, thereby initiating a clockwise rotation of the rotor 14. As will be appreciated by those of ordinary skill in the art, if it is desired to have rotation in the counter-clockwise direction, the magnets 34 and 36 should be placed on the opposite sides of the stator poles 16 and 18, respectively. As will also be appreciated by those of ordinary skill in the art, the angle α can be varied depending on where in the windings the magnets 34 and 36 are placed so long as oe is less than 90°.

The windings of the energizing coils 24 and 26 around the poles 16 and 18, respectively, are defined by an inner winding 38a and an outer winding 38b. The magnets 34 and 36 are disposed between the inner windings 38a and the outer windings 38b. As a person of ordinary skill in the art will appreciate, the inner windings 38a and the outer windings 38b may each have any number of turns of the energizing coils 24 and 26. In one example, the inner windings 38a have 100 turns of the coils and the outer windings 38b have 120 turns of the coils.

Figure 5:
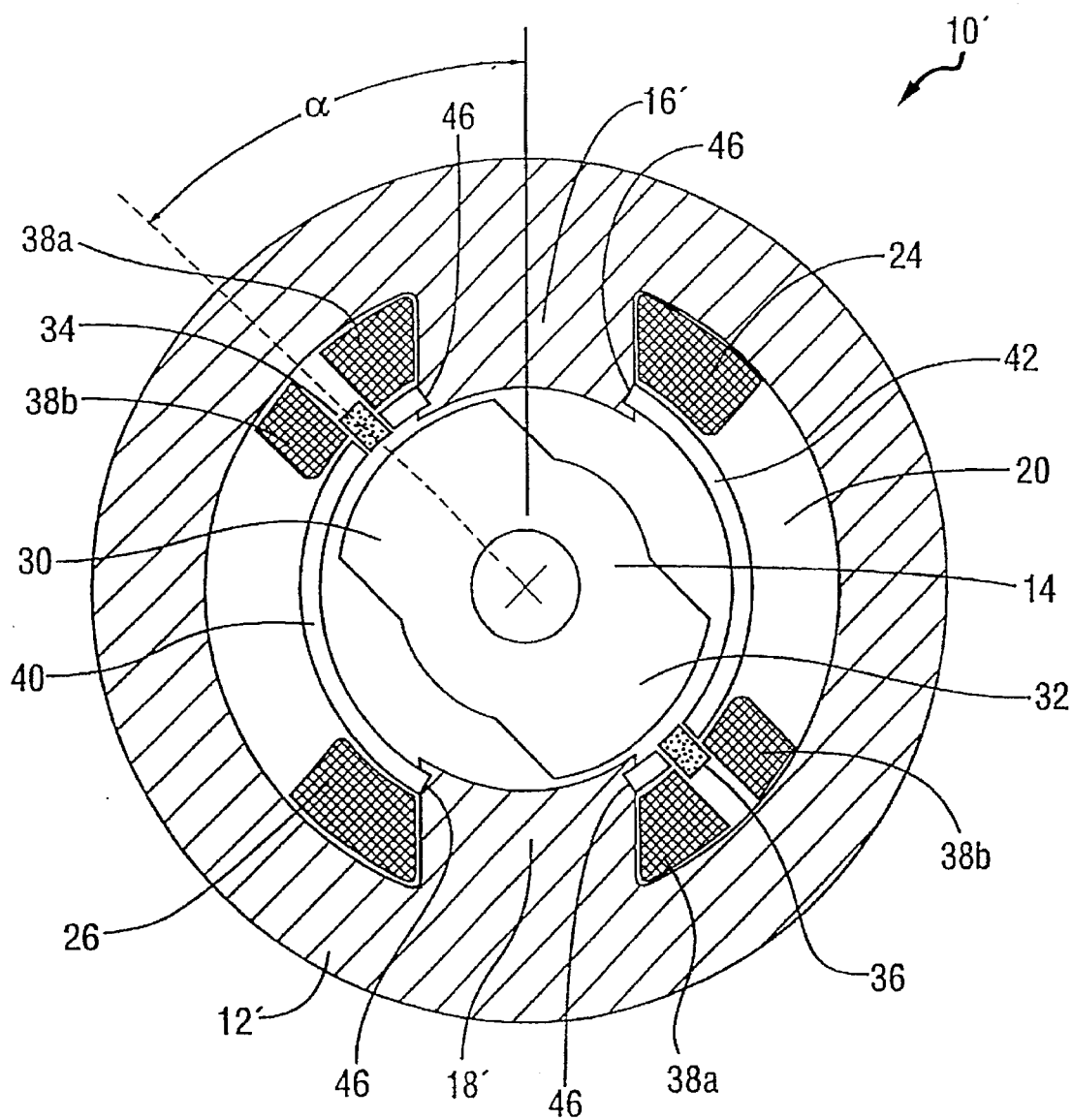
FIG. 5 is a diagram of another embodiment of a single-phase variable reluctance motor according to the present invention.
Figure 6:
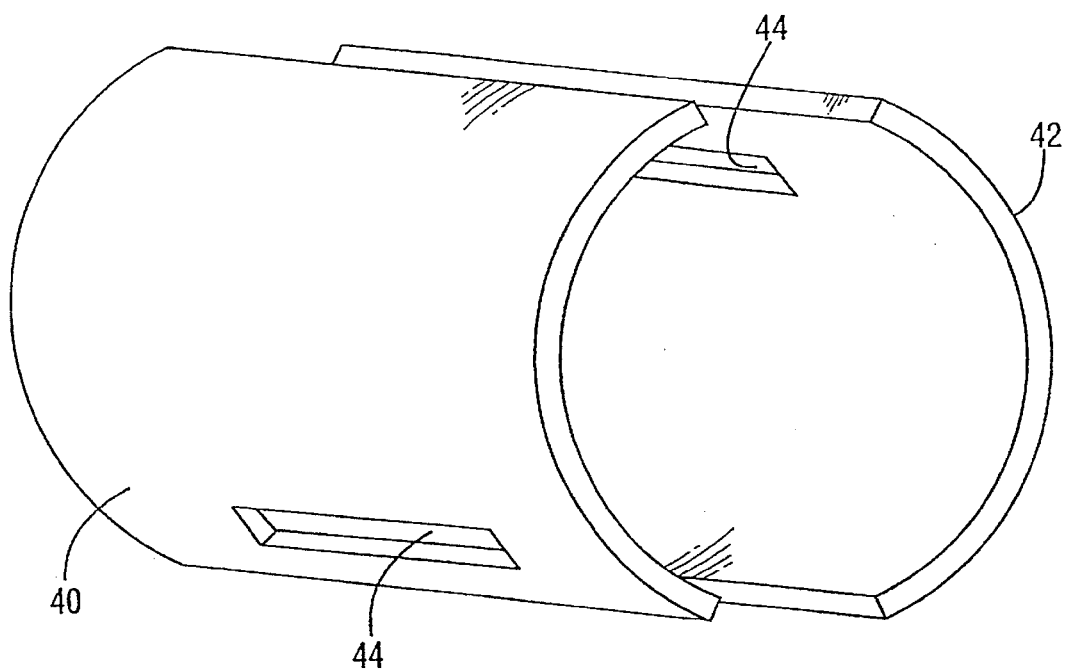
FIG. 6 is a diagram of a pair of slot wedges used in the embodiment of the single-phase variable reluctance motor shown in FIG. 5.

An alternate embodiment of the present invention is shown in FIG. 5. In this embodiment, a pair of curve-shaped slot wedges 40 and 42 are provided to separate the energizing coils 24 and 26 from the central bore 20. Each of the pair of curve-shaped slot wedges 40 and 42 has a cut-out portion 44, as shown in FIG. 6. The slot wedges 40 and 42 are retained in notches 46 formed in the stator poles 16' and 18', as shown in FIG. 5. The cut-out portions 44 are aligned with the magnets 34 and 36, so that the magnets are closely aligned to the central bore 20 thereby enabling the magnets to exert higher magnetic force on the rotor poles 30 and 32 than would otherwise be possible. The magnets 34 and 36 are preferably selected so that the magnetic force which they exert on the rotor poles 30 and 32 is no greater than the minimum force necessary to align the rotor 14 in the preferred starting position. This minimizes any parasitic losses associated with the presence of the magnet when the rotor is in motion and hence reduces any fall in the efficiency of the motor.

The stator 12 of the motor 10 shown in FIG. 4 is preferably constructed as follows. First, the inner windings 38a are created by winding a predetermined number of turns of the energizing coils 24 and 26, for example 100 turns, around the poles 16 and 18, respectively. Next, a pair of dummy blocks (not shown) are incorporated into the energizing coils 24 and 26 as the outer windings 38b are formed. The outer windings 38b are formed by winding a predetermined number of turns of the energizing coils 24 and 26, for example 120 turns, around the dummy blocks and inner windings 38a formed around the poles 16 and 18, respectively. Once the outer windings 38b are formed, the pair of dummy blocks may be removed and the magnets 34 and 36 are then inserted into the gaps formed by the dummy blocks. The magnets 34 and 36 may be secured to the energized coils 24 and 26 with a high temperature epoxy glue or similar material. It is undesirable for the magnets 34 and 36 to protrude into the air-gap formed in the central bore 20 because they may contact the rotor and interfere with its rotation. Nevertheless, it is preferable that they are positioned as close as reasonably possible to the central bore 20. This step can be facilitated if the side of the magnets 34 and 36 facing the central bore 20 is curve-shaped, as shown in FIG. 4. The motor 10 can then be constructed as is known in the art.

To construct the stator 12' of the alternate embodiment shown in FIG. 5, the same steps should be followed. The only additional step is to mount the slot wedges 40 and 42 to the stator 12'. This is accomplished by inserting the slot wedges 40 and 42 into the notches 46 formed in the poles 16' and 18'. In performing this step, it is important to align the cut-out portions 44 in the slot wedges 40 and 42 with the magnets 34 and 36, so as to expose them to the central bore 20. The motor 10' can then be constructed as is known in the art.

While the present invention is susceptible to various modifications and alternative forms, specific embodiments have been shown by way of example in the drawings and description herein. However, it should be understood that the invention is not intended to be limited to the particular forms disclosed. Rather, the invention is intended to cover all modifications, equivalents and alternatives falling within the spirit and scope of the invention as defined by the appended claims.

What is claimed is:

1. A single-phase variable reluctance motor, comprising:

a stator having a pair of projecting poles defining a principal stator axis;

a rotor coupled to a rotatable shaft co-axial with the principal axis of the stator;

a first energizing coil wound around one of the pair of stator poles forming a first winding;

a second energizing coil wound around the other of the pair of stator poles forming a second winding; and a first permanent magnet positioned outside the one stator pole and embedded within the first one of said windings so as to locate the rotor in a preferred position when said first and second coils are not energized.

2. The single-phase variable reluctance motor as defined in claim 1, further comprising a second permanent magnet positioned within the second one of said windings formed by the second energizing coil, said first and second permanent magnets being diametrically opposed to one another.

3. The single-phase variable reluctance motor as defined in claim 2 wherein the stator poles are inwardly projecting and terminate at a central bore, wherein the rotor poles are outwardly projecting, and wherein the rotor is positioned within the central bore.

4. A method of starting a single-phase variable reluctance motor defined by a stator having a pair of projecting poles defining a principal stator axis; an energizing coil wound around one of said stator poles; and a rotor having a pair of projecting poles formed of ferromagnetic materials, said rotor being mounted to a shaft co-axial with the principal axis of the stator, said method comprising the steps of:

positioning the rotor in a preferred starting position when the energizing coil is not energized, said positioning step being performed by the attraction of the poles of the rotor to at least one permanent magnet positioned outside said one of stator poles and embedded within the energizing coil; and energizing the energizing coil.

5. A method of starting a single-phase variable reluctance motor defined by a stator having a pair of inwardly projecting poles terminating at a central bore, energizing coils wound around the pair of stator poles, and a rotor having a pair of outwardly projecting poles formed of a ferromagnetic material, said rotor being rotatably mounted to a shaft in the central bore, said method comprising the steps of:

positioning the rotor in a preferred starting position when the energizing coils are not energized, said positioning step being performed by the attraction of the poles of the rotor by at least one permanent magnet positioned outside said stator poles and embedded in at least one energizing coil; and energizing the coil.

6. A single-phase variable reluctance motor, comprising:

a stator having a pair of projecting poles defining a principal stator axis;

a rotor coupled to a rotatable shaft co-axial with the principal axis of the stator;

an energizing coil wound around one of the stator poles forming a phase winding; and a permanent magnet positioned outside the one stator pole and embedded within said phase winding so as to locate the rotor in a preferred position when said energizing coil is not energized.

7. The single-phase variable reluctance motor as defined in claim 6, wherein the stator poles are inwardly projecting and terminate at a central bore, wherein the rotor poles are outwardly projecting, and wherein the rotor is positioned within the central bore.

8. A single-phase variable reluctance motor, comprising:

a stator having a pair of projecting poles defining a principal stator axis, wherein the stator poles are inwardly projecting and terminate at a central bore;

a rotor coupled to a rotatable shaft co-axial with the principal axis of the stator, the rotor defining a plurality of outwardly projecting rotor poles, wherein the rotor is positioned within the central bore, and wherein the stator and the rotor are formed of laminations of a ferromagnetic material;

a first energizing coil wound around one of the pair of stator poles forming a first winding;

a second energizing coil wound around the other of the pair of stator poles forming a second winding;

a first permanent magnet positioned outside the one of the pair of stator poles and embedded within the first one of said windings so as to locate the rotor in a preferred position when said first and second coils are not energized; and a second permanent magnet positioned within the second one of said windings formed by the second energizing coil, said first and second permanent magnets being diametrically opposed to one another.

9. A single-phase variable reluctance motor, comprising:

a stator having a pair of projecting poles defining a principal stator;

a rotor coupled to a rotatable shaft co-axial with the principal axis of the stator axis;

a first energizing coil wound around one of the pair of stator poles forming a first winding;

a second energizing coil wound around the other of the pair of stator poles forming a second winding;

a first permanent magnet positioned outside the one of the pair of stator poles and embedded within the first one of said windings so as to locate the rotor in a preferred position when said first and second coils are not energized; and a second permanent magnet positioned within the second one of said windings formed by the second energizing coil, said first and second permanent magnets being diametrically opposed to one another;

wherein each of the first and second windings is defined by an inner winding and an outer winding.

10. The single-phase variable reluctance motor as defined in claim 9, wherein the first permanent magnet is disposed between the inner and outer windings of the first winding and the second permanent magnet is disposed between the inner and outer windings of the second winding.

11. A single-phase variable reluctance motor, comprising:

a stator having a pair of projecting poles defining a principal stator axis;

a rotor coupled to a rotatable shaft co-axial with the principal axis of the stator;

a first energizing coil wound around one of the pair of stator poles forming a first winding;

a second energizing coil wound around the other of the pair of stator poles forming a second winding;

a first permanent magnet positioned outside the one of the pair of stator poles and embedded within the first one of said windings so as to locate the rotor in a preferred position when said first and second coils are not energized;

a second permanent magnet positioned within the second one of said windings formed by the second energizing coil, said first and second permanent magnets being diametrically opposed to one another; and a first slot wedge disposed in the central bore adjacent to the first permanent magnet that separates the first energizing coil from the central bore, and a second slot wedge disposed in the central bore adjacent to the second permanent magnet that separates the second energizing coil from the central bore.

12. The single-phase variable reluctance motor as defined in claim 11, wherein each of the first and second slot wedges has a cut-out portion that is aligned with its corresponding adjacent permanent magnet thereby exposing the permanent magnets to the central bore.

13. The single-phase variable reluctance motor as defined in claim 11, wherein the pair of stator poles has notches for securing the first and second slot wedges in the correct positions with respect to the central bore.

14. A single-phase variable reluctance motor, comprising:

a stator having a pair of projecting poles defining a principal stator axis;

a rotor coupled to a rotatable shaft co-axial with the principal axis of the stator, the rotor defining a plurality of rotor poles;

a first energizing coil wound around one of the pair of stator poles forming a first winding;

a second energizing coil wound around the other of the pair of stator poles forming a second winding; and a first permanent magnet positioned outside the one of the pair of stator poles and embedded within the first one of said windings so as to locate the rotor in a preferred position when said first and second coils are not energized;

wherein the stator poles are inwardly projecting and terminate at a central bore, wherein the rotor poles are outwardly projecting, and wherein the rotor is positioned within the central bore.

15. A single-phase variable reluctance motor, comprising:

a stator having a pair of projecting poles defining a principal stator axis;

a rotor coupled to a rotatable shaft co-axial with the principal axis of the stator;

an energizing coil wound around one of the stator poles forming a phase winding wherein the phase winding is defined by an inner winding and an outer winding; and a permanent magnet positioned within said phase winding so as to locate the rotor in a preferred position when said energization coil is not energized, wherein the permanent magnet is positioned outside of the stator poles between the inner winding and the outer winding.

16. The single-phase variable reluctance motor as defined in claim 15, further comprising a first slot wedge disposed in the central bore adjacent to the permanent magnet, wherein said slot wedge separates the energizing coil from the central bore.

17. The single-phase variable reluctance motor as defined in claim 16, wherein said slot wedge has a cut-out portion that is aligned with the permanent magnet thereby exposing the permanent magnet to the central bore.

18. The single-phase variable reluctance motor as defined in claim 16, wherein the pair of stator poles has notches for securing the slot wedge in the correct position with respect to the central bore.

* * * * *

UNITED STATES PATENT AND TRADEMARK OFFICE
CERTIFICATE OF CORRECTION

PATENT NO.    :   5,650,682
DATED         :   July 22, 1997
INVENTOR(S)   :   James Christopher Rudd Smart It is certified that error appears in the above-identified patent and that said Letters Patent is hereby corrected as shown below:

On the title page, under the heading labeled "References Cited", under the subheading labeled "FOREIGN PATENT DOCUMENTS", please insert --    0601818A1    6/1994    Europe    --.

On the title page, under the heading labeled "References Cited", under the subheading labeled "OTHER PUBLICATIONS", please insert --    Abstract of JP 2119651 dated July 5, 1990 to Toshio    --.

Signed and Sealed this

Twenty-eighth Day of October, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.    :   5,650,682
DATED         :   July 22, 1997
INVENTOR(S)   :   James Christopher Rudd Smart It is certified that error appears in the above-identified patent and that said Letters Patent is hereby corrected as shown below:

In column 5, line 21, following "angle" and before "can", please delete "a" and insert therefor --$\alpha$--.

In column 5, line 23, following "as" and before "is", please delete "oe" and insert therefor --$\alpha$--.

Signed and Sealed this

Second Day of December, 1997

Attest:

BRUCE LEHMAN

*Attesting Officer*           *Commissioner of Patents and Trademarks*